United States Patent
Park et al.

(10) Patent No.: US 12,362,383 B2
(45) Date of Patent: Jul. 15, 2025

(54) METHOD OF MANUFACTURING NEGATIVE ELECTRODE FOR LITHIUM SECONDARY BATTERY AND NEGATIVE ELECTRODE FOR LITHIUM SECONDARY BATTERY MANUFACTURED USING THE SAME

(71) Applicant: LG Chem, Ltd., Seoul (KR)

(72) Inventors: Sol Ji Park, Daejeon (KR); Kyoung Ho Ahn, Daejeon (KR); Chul Haeng Lee, Daejeon (KR); Jun Hyeok Han, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 803 days.

(21) Appl. No.: 17/262,534

(22) PCT Filed: Aug. 14, 2019

(86) PCT No.: PCT/KR2019/010387
§ 371 (c)(1),
(2) Date: Jan. 22, 2021

(87) PCT Pub. No.: WO2020/036444
PCT Pub. Date: Feb. 20, 2020

(65) Prior Publication Data
US 2021/0288346 A1     Sep. 16, 2021

(30) Foreign Application Priority Data

Aug. 16, 2018 (KR) .................. 10-2018-0095547
Aug. 16, 2018 (KR) .................. 10-2018-0095548

(51) Int. Cl.
*H01M 10/0562* (2010.01)
*H01M 4/04* (2006.01)
(Continued)

(52) U.S. Cl.
CPC ..... *H01M 10/0562* (2013.01); *H01M 4/0407* (2013.01); *H01M 4/366* (2013.01);
(Continued)

(58) Field of Classification Search
None
See application file for complete search history.

(56) References Cited

U.S. PATENT DOCUMENTS

| 2009/0226819 A1 | 9/2009 | Hara et al. |
| 2010/0178557 A1 | 7/2010 | Lee et al. |

(Continued)

FOREIGN PATENT DOCUMENTS

| CN | 101523658 A | 9/2009 |
| CN | 101533929 A | 9/2009 |

(Continued)

OTHER PUBLICATIONS

English translation of JP 2002/042792 (Year: 2002).*
(Continued)

*Primary Examiner* — Yoshitoshi Takeuchi
(74) *Attorney, Agent, or Firm* — Lerner David LLP

(57) ABSTRACT

Provided are a method of manufacturing a negative electrode for a lithium secondary battery, which includes: preparing a working electrode including a metal thin film; preparing a composition for forming a first solid electrolyte layer including an additive including at least one salt selected from salts represented by Chemical Formula 1 to Chemical Formula 5 and a glyme-based solvent; fabricating a half-cell including the working electrode, a counter electrode, a reference electrode, and the composition for forming a first solid electrolyte layer; forming a first solid electrolyte layer on the working electrode by operating the half-cell; and separating the working electrode on which the first solid electrolyte layer has been formed, and a negative electrode (Continued)

for a lithium secondary battery manufactured by the above-described method.

6 Claims, 3 Drawing Sheets

(51) Int. Cl.
    *H01M 4/134*     (2010.01)
    *H01M 4/1395*     (2010.01)
    *H01M 4/36*     (2006.01)
    *H01M 4/38*     (2006.01)
    *H01M 10/0525*     (2010.01)
    *H01M 4/02*     (2006.01)

(52) U.S. Cl.
    CPC ......... *H01M 4/38* (2013.01); *H01M 10/0525* (2013.01); *H01M 2004/027* (2013.01); *H01M 2300/0065* (2013.01)

(56) References Cited

U.S. PATENT DOCUMENTS

| | | | |
|---|---|---|---|
| 2011/0111289 A1 | 5/2011 | Choi et al. | |
| 2013/0236795 A1 | 9/2013 | Lee et al. | |
| 2013/0288139 A1* | 10/2013 | Choi | H01M 10/0567 429/200 |
| 2014/0011081 A1 | 1/2014 | Ahn et al. | |
| 2014/0125292 A1 | 5/2014 | Best et al. | |
| 2014/0248543 A1* | 9/2014 | Zhu | H01M 10/0525 205/60 |
| 2015/0086880 A1* | 3/2015 | Ahn | H01M 10/052 429/188 |
| 2016/0027592 A1* | 1/2016 | Shimamoto | H01G 11/60 429/188 |
| 2016/0126582 A1 | 5/2016 | Xiao et al. | |
| 2016/0141598 A1 | 5/2016 | Dai et al. | |
| 2017/0162859 A1 | 6/2017 | Yang et al. | |
| 2017/0237126 A1* | 8/2017 | Son | H01M 10/0525 429/188 |
| 2017/0271091 A1 | 9/2017 | Abe et al. | |
| 2017/0346137 A1 | 11/2017 | Chang et al. | |
| 2018/0026261 A1 | 1/2018 | Kim et al. | |
| 2020/0220167 A1 | 7/2020 | Kim et al. | |

FOREIGN PATENT DOCUMENTS

| | | | |
|---|---|---|---|
| CN | 102055015 A | 5/2011 | |
| CN | 103378371 A | 10/2013 | |
| CN | 103597647 A | 2/2014 | |
| CN | 105074996 A | 11/2015 | |
| CN | 105609700 A | 5/2016 | |
| JP | 2002/042792 | * 2/2002 | ............. H01G 11/14 |
| JP | 2009176534 A | 8/2009 | |
| KR | 20080032606 A | 4/2008 | |
| KR | 20110051618 A | 5/2011 | |
| KR | 20130122282 A | 11/2013 | |
| KR | 20140008048 A | 1/2014 | |
| KR | 20140099864 A | 8/2014 | |
| KR | 20150014877 A | 2/2015 | |
| KR | 20160109878 A | 9/2016 | |
| KR | 101699858 B1 | 1/2017 | |
| KR | 20170034313 A | 3/2017 | |
| KR | 20170134037 A | 12/2017 | |
| KR | 20180070418 A | 6/2018 | |

OTHER PUBLICATIONS

Search Report dated Apr. 15, 2024 from the Office Action for Chinese Application No. 201980049655.9 Issued Apr. 17, 2024, pp. 1-2.

* cited by examiner

Prior Art

METHOD OF MANUFACTURING NEGATIVE ELECTRODE FOR LITHIUM SECONDARY BATTERY AND NEGATIVE ELECTRODE FOR LITHIUM SECONDARY BATTERY MANUFACTURED USING THE SAME

CROSS-REFERENCE TO RELATED APPLICATIONS

This application is a national phase entry under 35 U.S.C. § 371 of International Application No. PCT/KR2019/010387 filed Aug. 14, 2019, which claims priority from Korean Patent Application Nos. 10-2018-0095548 filed Aug. 16, 2018, and 10-2018-0095547 filed Aug. 16, 2018, all of which are incorporated herein by reference.

TECHNICAL FIELD

The present invention relates to a method of manufacturing a negative electrode for a lithium secondary battery and a negative electrode for a lithium secondary battery manufactured using the same, and more specifically, to a method of manufacturing a negative electrode for a lithium secondary battery, which is capable of reducing interfacial resistance, and a negative electrode for a lithium secondary battery manufactured using the same.

BACKGROUND ART

As personal IT devices and computer networks are developed due to the development of the information society, and accordingly, dependence on electric energy increases throughout the society, there is a need for development of technology for efficiently storing and utilizing electric energy.

Among the technologies developed for the need, the secondary battery-based technology is most suitable for various applications. Secondary batteries have attracted considerable interest because they can be miniaturized to be applied to personal IT devices and the like and can also be applied to electric vehicles, energy storage systems, and the like. Among the secondary battery-based technologies, lithium secondary batteries, which are the battery system theoretically having the highest energy density, are in the spotlight and are currently being applied to several devices.

Generally, the lithium secondary battery consists of a positive electrode formed of a transition metal oxide containing lithium, a negative electrode capable of storing lithium, and an electrolyte serving as a medium that transfers lithium ions, and optionally includes a separator. Among these components, the electrolyte is known as a component which greatly affects the stability, safety, and the like of the battery, and therefore, research thereon has been actively conducted.

Since the potential of the negative electrode is below the potential window of the electrolyte used in the lithium secondary battery, the electrolyte is reductively decomposed on the negative electrode during the activation or charging/discharging of the battery. The product formed by reductively decomposing the electrolyte forms a solid electrolyte interphase (SEI) membrane which may allow lithium ions to permeate and allow the further decomposition of the electrolyte to be suppressed.

Meanwhile, the lithium secondary battery has problems of an increase in interfacial resistance and degradation of capacity during charging/discharging or storage. As one of the causes of these problems, the further decomposition of salts contained in the electrolyte is suggested. Specifically, after the SEI membrane is formed, salts contained in the electrolyte further react with the surface of the negative electrode, such that the thickness of the SEI membrane may be partially increased to form an uneven SEI membrane or the initially formed SEI membrane may be damaged. As a result, a decomposition chain reaction of the electrolyte may take place, causing the negative electrode to be self-discharged.

In addition, when the SEI membrane is incompletely formed, the further decomposition of the electrolyte solution is not suppressed so as to damage the SEI membrane and simultaneously increase interfacial resistance, and therefore, the overall potential of the battery may be decreased, and the capacity characteristics of the battery may also be degraded. In particular, when the battery is overcharged, the electrolyte solution may be further decomposed more actively, such that not only the above problems but also the heat generation and ignition inside the battery, which are caused by an increase in interfacial resistance, may occur.

Meanwhile, in recent years, research on application of a solid polymer electrolyte or a solid electrolyte to the battery has been actively conducted to improve the safety of the battery. However, the solid-type electrolyte is problematic because it is more greatly affected by interfacial resistance compared with the case in which a liquid- or gel-type electrolyte is applied to the battery.

Therefore, a method of suppressing an increase in interfacial resistance of a negative electrode while maintaining high capacity of a battery by stably forming and maintaining a solid electrolyte layer on the negative electrode can be designed.

(Patent Document 1) Korean Unexamined Patent Publication No. 10-2014-0008048

DISCLOSURE

Technical Problem

The present invention is directed to providing a method of manufacturing a negative electrode for a lithium secondary battery, which is capable of reducing interfacial resistance between a negative electrode and an electrolyte and improving capacity characteristics, and a negative electrode manufactured using the same.

Technical Solution

One aspect of the present invention provides a method of manufacturing a negative electrode for a lithium secondary battery, which includes: preparing a working electrode including a metal thin film; preparing a composition for forming a first solid electrolyte layer including an additive including at least one salt selected from salts represented by the following Chemical Formula 1 to Chemical Formula 5 and a glyme-based solvent; fabricating a half-cell including the working electrode, a counter electrode, a reference electrode, and the composition for forming a first solid electrolyte layer; forming a first solid electrolyte layer on the working electrode by operating the half-cell; and separating the working electrode on which the first solid electrolyte layer has been formed.

[Chemical Formula 1]

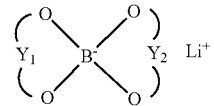

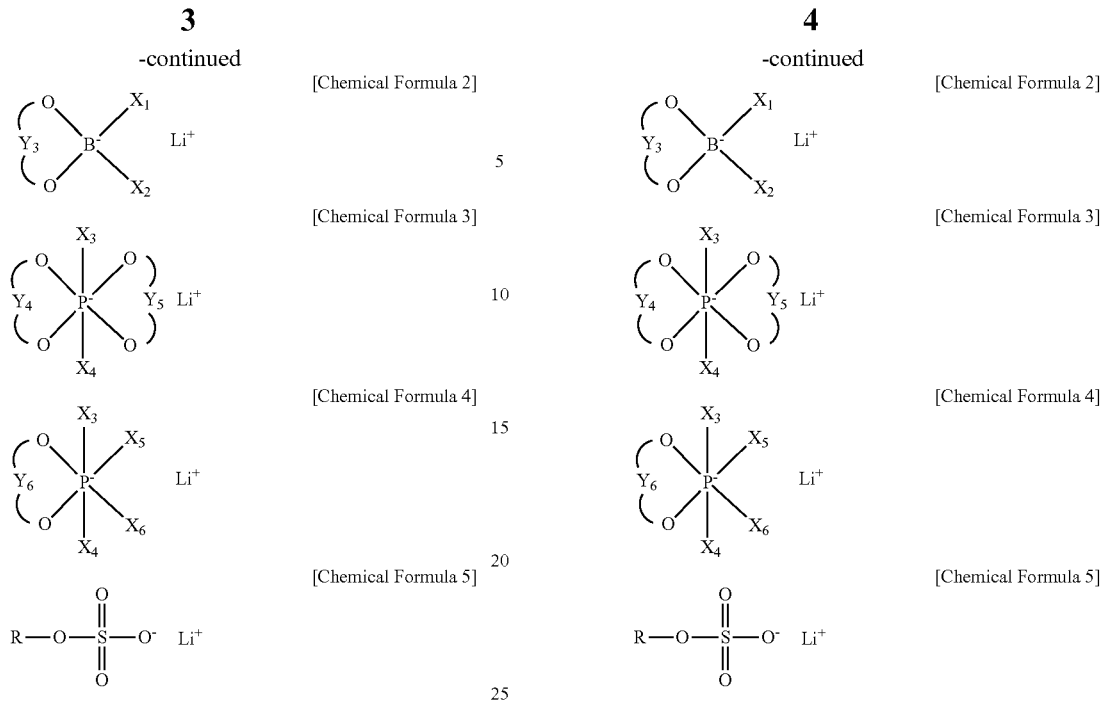

In Chemical Formula 1 to Chemical Formula 4, $Y_1$ to $Y_6$ each independently connect with adjacent oxygens to form a ring having a C1 to C3 alkyl group, and hydrogen of the ring may be substituted with at least one of a halogen atom, oxygen, or a C1 to C3 alkyl group substituted with a halogen atom or unsubstituted, in Chemical Formula 2 to Chemical Formula 4, $X_1$ to $X_6$ are each independently a halogen atom, and in Chemical Formula 5, R is a substituted or unsubstituted C1 to C5 alkyl group.

For example, the working electrode may be prepared by forming, on a metal thin film, a second solid electrolyte layer including inorganic oxide particles and a polymer.

The additive may be included in an amount of 0.1 part by weight to 30 parts by weight with respect to 100 parts by weight of the composition for forming a first solid electrolyte layer.

Meanwhile, the metal thin film may include at least one metal selected from the group consisting of copper, nickel, and lithium or a combination thereof.

The metal thin film may have a multi-layer structure and include at least one lithium-containing metal layer.

Another aspect of the present invention provides a negative electrode for a lithium secondary battery which includes a metal thin film and a first solid electrolyte layer formed on the metal thin film, wherein the first solid electrolyte layer is formed by reducing a composition for forming a first solid electrolyte layer including an additive including at least one salt selected from salts represented by the following Chemical Formula 1 to Chemical Formula 5 and a glyme-based solvent:

[Chemical Formula 1]

In Chemical Formula 1 to Chemical Formula 4, $Y_1$ to $Y_6$ each independently connect with adjacent oxygens to form a ring having a C1 to C3 alkyl group, and hydrogen of the ring may be substituted with at least one of a halogen atom, oxygen, or a C1 to C3 alkyl group substituted with a halogen atom or unsubstituted, in Chemical Formula 2 to Chemical Formula 4, $X_1$ to $X_6$ are each independently a halogen atom, and in Chemical Formula 5, R is a substituted or unsubstituted C1 to C5 alkyl group.

Meanwhile, the negative electrode for a lithium secondary battery according to the present invention may further include, on the first solid electrolyte layer, a second solid electrolyte layer including inorganic oxide particles and a polymer.

Advantageous Effects

When a negative electrode is manufactured using a method of manufacturing a negative electrode for a lithium secondary battery according to the present invention, the application of a negative electrode in which a solid electrolyte layer is stably formed to a battery is possible, and therefore, the further decomposition of an electrolyte can be suppressed to prevent the interfacial resistance of the negative electrode from increasing and improve the capacity characteristics of the battery.

MODES OF THE INVENTION

Figure 1:
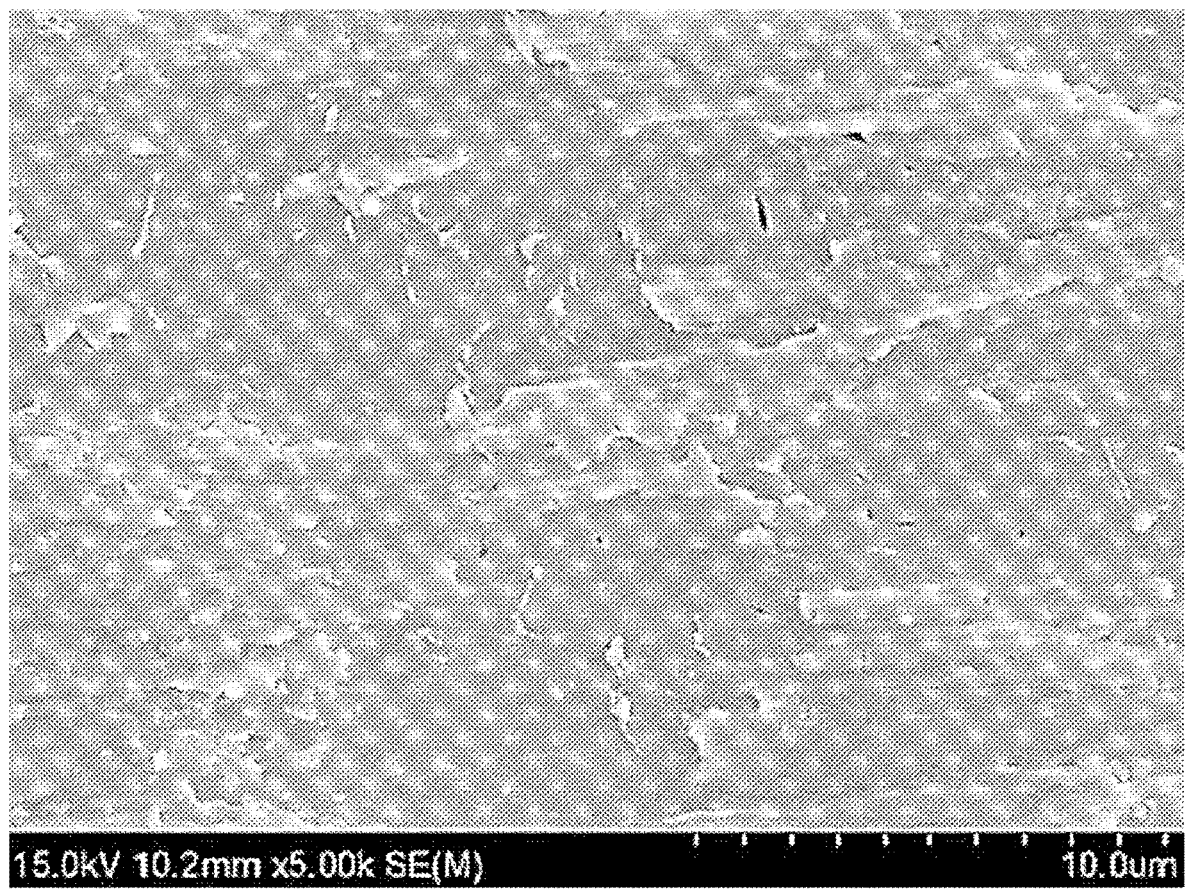
FIG. 1 is a scanning electron microscope (SEM) image of a negative electrode for a lithium secondary battery according to Comparative Example 1.

Hereinafter, the present invention will be described in more detail.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

The terminology provided herein is merely used for the purpose of describing particular embodiments, and is not intended to be limiting of the present invention. The singular forms "a," "an," and "the" are intended to include the plural forms as well, unless the context clearly indicates otherwise.

It should be understood that the terms "comprises," "comprising," "includes," "including," "has," and/or "having," when used herein, specify the presence of stated features, integers, steps, operations, elements, components and/or combinations thereof, but do not preclude the presence or addition of one or more other features, integers, steps, operations, elements, components and/or combinations thereof.

<Method of Manufacturing Negative Electrode for Lithium Secondary Battery>

A method of manufacturing a negative electrode for a lithium secondary battery according to the present invention includes (1) preparing a working electrode, (2) preparing a composition for forming a first solid electrolyte layer, (3) fabricating a half-cell, (4) forming a first solid electrolyte layer on the working electrode, and (5) separating the working electrode on which the first solid electrolyte layer has been formed. Hereinafter, the method will be described for each step.

(1) Step of Preparing Working Electrode

Firstly, a working electrode including a metal thin film is prepared. The working electrode is used to manufacture an electrode for a lithium secondary battery, and unlike a full-cell, a half-cell may use only one electrode of a cathode and an anode as a working electrode. In this case, when the working electrode, a counter electrode, and a reference electrode are provided and then a composition for forming a solid electrolyte interphase (SEI) is interposed theramong, the composition for forming an SEI may be used as an ion transfer medium by operating the half-cell in a later step and, simultaneously, reduced on the working electrode, thereby forming an SEI membrane.

Here, the metal used in the metal thin film may be at least one metal selected from the group consisting of copper, nickel, and lithium or a combination thereof.

Meanwhile, the metal thin film may have a multi-layer structure and include at least one lithium-containing metal layer.

As a specific example, when the metal thin film consists of at least one metal selected from the group consisting of copper and nickel or a combination thereof, the metal thin film may further include a lithium-containing metal layer on the surface thereof. In this case, in order to further include the lithium-containing metal layer, a conventional method of forming a metal layer, e.g., rolling, sputtering, or electroplating a lithium metal on a metal thin film, may be used without limitation.

When the metal thin film further including a lithium metal layer is used as a working electrode such that lithium ions (Li$^+$) may be introduced to the working electrode and deposited as the lithium metal during charging of the battery, a more uniform deposition can be realized in the aspect of surface energy.

Meanwhile, as the working electrode, a metal thin film may be used alone, and a metal thin film on which a second solid electrolyte layer including inorganic oxide particles and a polymer has been formed may be used.

The second solid electrolyte layer may be formed by applying a composition for forming a second solid electrolyte layer, which is prepared by adding inorganic oxide particles and a polymer to a solvent and then stirring, on one surface of the metal thin film and then removing the solvent by a method such as drying and the like.

When a negative electrode for a lithium secondary battery, which is manufactured using, as a working electrode, the metal thin film on which a second solid electrolyte layer has been formed as described above, is used along with a solid electrolyte, the interfacial contact resistance between the electrode and the electrolyte may be lowered, and the inclusion of inorganic oxide particles with high ion conductivity may also provide the enhancement of ion conductivity in a battery.

The solvent may include an organic solvent such as N-methyl-2-pyrrolidone (NMP) and the like.

The inorganic oxide particle may include at least one element selected from the group consisting of Li, La, Zr, Ti, Al, Ge, P, W, Nb, Te, Ln, Si, Nd, N, S, Ba, Ga, In, F, Cl, Br, I, As, Se, Te, Sb, Sn, and Ru.

The polymer is not limited to a specific type, and any polymer may be used as long as it is capable of binding the inorganic oxide particles and may be used to improve physical rigidity and the like and enhance high-temperature stability.

(2) Step of Preparing Composition for Forming First Solid Electrolyte Layer

Next, the step of preparing a composition for forming a first solid electrolyte layer will be described. A composition for forming a first solid electrolyte layer according to the present invention includes an additive including at least one salt selected from salts represented by the following Chemical Formula 1 to Chemical Formula 5 and a glyme-based solvent.

[Chemical Formula 1]

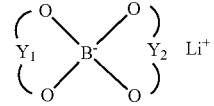

In Chemical Formula 1, $Y_1$ and $Y_2$ each independently connect with adjacent oxygens to form a ring having a C1 to C3 alkyl group, and hydrogen of the ring may be substituted with at least one of a halogen atom, oxygen, or a C1 to C3 alkyl group substituted with a halogen atom or unsubstituted.

In this case, the salt represented by Chemical Formula 1 may be represented by at least one selected from the group consisting of the following Chemical Formulas 1-1 to 1-13.

[Chemical Formula 1-1]

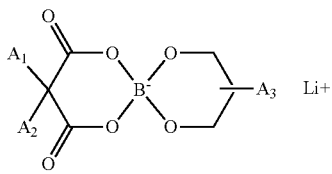

In Chemical Formula 1-1, $A_1$ to $A_3$ are each independently selected from the group consisting of hydrogen, a halogen atom, and a C1 to C3 alkyl group substituted with a halogen atom or unsubstituted.

[Chemical Formula 1-2]

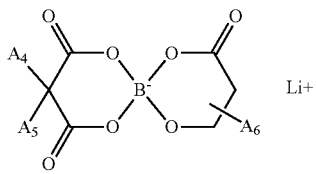

In Chemical Formula 1-2, $A_4$ to $A_6$ are each independently selected from the group consisting of hydrogen, a halogen atom, and a C1 to C3 alkyl group substituted with a halogen atom or unsubstituted.

[Chemical Formula 1-3]

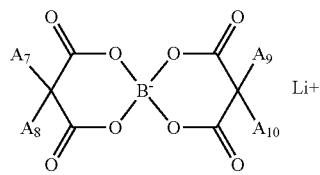

In Chemical Formula 1-3, $A_7$ to $A_{10}$ are each independently selected from the group consisting of hydrogen, a halogen atom, and a C1 to C3 alkyl group substituted with a halogen atom or unsubstituted.

[Chemical Formula 1-4]

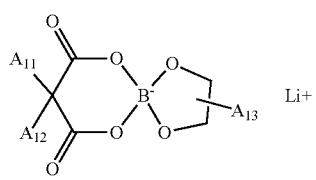

In Chemical Formula 1-4, $A_{11}$ to $A_{13}$ are each independently selected from the group consisting of hydrogen, a halogen atom, and a C1 to C3 alkyl group substituted with a halogen atom or unsubstituted.

[Chemical Formula 1-5]

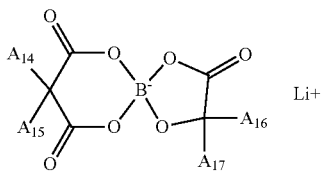

In Chemical Formula 1-5, $A_{14}$ to $A_{17}$ are each independently selected from the group consisting of hydrogen, a halogen atom, and a C1 to C3 alkyl group substituted with a halogen atom or unsubstituted.

[Chemical Formula 1-6]

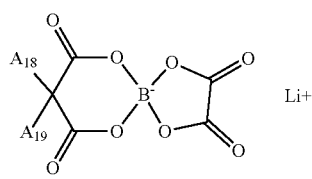

In Chemical Formula 1-6, $A_{18}$ and $A_{19}$ are each independently selected from the group consisting of hydrogen, a halogen atom, and a C1 to C3 alkyl group substituted with a halogen atom or unsubstituted.

[Chemical Formula 1-7]

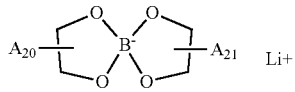

In Chemical Formula 1-7, $A_{20}$ and $A_{21}$ are each independently selected from the group consisting of hydrogen, a halogen atom, and a C1 to C3 alkyl group substituted with a halogen atom or unsubstituted.

[Chemical Formula 1-8]

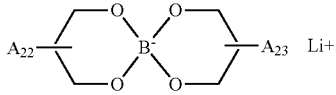

In Chemical Formula 1-8, $A_{22}$ and $A_{23}$ are each independently selected from the group consisting of hydrogen, a halogen atom, and a C1 to C3 alkyl group substituted with a halogen atom or unsubstituted.

[Chemical Formula 1-9]

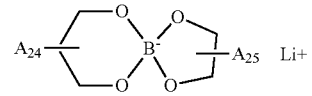

In Chemical Formula 1-9, $A_{24}$ and $A_{25}$ are each independently selected from the group consisting of hydrogen, a halogen atom, and a C1 to C3 alkyl group substituted with a halogen atom or unsubstituted.

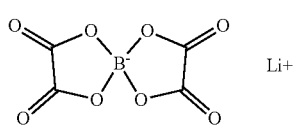

[Chemical Formula 1-10]

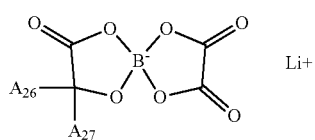

[Chemical Formula 1-11]

In Chemical Formula 1-11, $A_{26}$ and $A_{27}$ are each independently selected from the group consisting of hydrogen, a halogen atom, and a C1 to C3 alkyl group substituted with a halogen atom or unsubstituted.

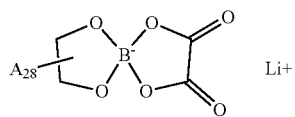

[Chemical Formula 1-12]

In Chemical Formula 1-12, $A_{28}$ is selected from the group consisting of hydrogen, a halogen atom, and a C1 to C3 alkyl group substituted with a halogen atom or unsubstituted.

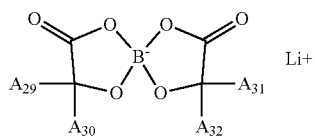

[Chemical Formula 1-13]

In Chemical Formula 1-13, $A_{29}$ to $A_{32}$ are each independently selected from the group consisting of hydrogen, a halogen atom, and a C1 to C3 alkyl group substituted with a halogen atom or unsubstituted.

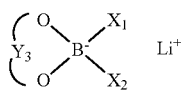

[Chemical Formula 2]

In Chemical Formula 2, $X_1$ and $X_2$ are each independently a halogen atom, and $Y_3$ connects with adjacent oxygens to form a ring having a C1 to C3 alkyl group, wherein hydrogen of the ring may be substituted with at least one of a halogen atom, oxygen, or a C1 to C3 alkyl group substituted with a halogen atom or unsubstituted.

In this case, the salt represented by Chemical Formula 2 may be represented by at least one selected from the group consisting of the following Chemical Formulas 2-1 to 2-6.

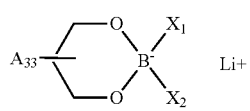

[Chemical Formula 2-1]

In Chemical Formula 2-1, $X_1$ and $X_2$ are each independently a halogen atom, and $A_{33}$ is selected from the group consisting of hydrogen, a halogen atom, and a C1 to C3 alkyl group substituted with a halogen atom or unsubstituted.

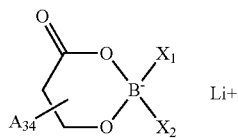

[Chemical Formula 2-2]

In Chemical Formula 2-2, $X_1$ and $X_2$ are each independently a halogen atom, and $A_{34}$ is selected from the group consisting of hydrogen, a halogen atom, and a C1 to C3 alkyl group substituted with a halogen atom or unsubstituted.

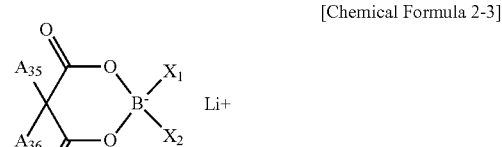

[Chemical Formula 2-3]

In Chemical Formula 2-3, $X_1$ and $X_2$ are each independently a halogen atom, and $A_{35}$ and $A_{36}$ are each independently selected from the group consisting of hydrogen, a halogen atom, and a C1 to C3 alkyl group substituted with a halogen atom or unsubstituted.

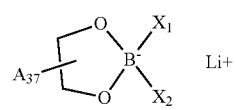

[Chemical Formula 2-4]

In Chemical Formula 2-4, $X_1$ and $X_2$ are each independently a halogen atom, and $A_{37}$ is selected from the group consisting of hydrogen, a halogen atom, and a C1 to C3 alkyl group substituted with a halogen atom or unsubstituted.

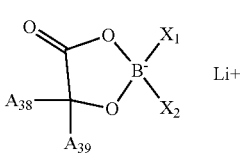

[Chemical Formula 2-5]

In Chemical Formula 2-5, $X_1$ and $X_2$ are each independently a halogen atom, and $A_{38}$ and $A_{39}$ are each independently selected from the group consisting of hydrogen, a halogen atom, and a C1 to C3 alkyl group substituted with a halogen atom or unsubstituted.

[Chemical Formula 2-6]

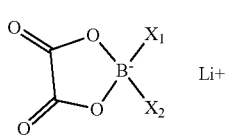

In Chemical Formula 2-6, $X_1$ and $X_2$ are each independently a halogen atom.

[Chemical Formula 3]

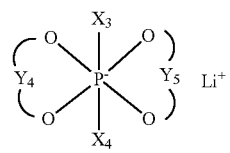

In Chemical Formula 3, $X_3$ and $X_4$ are each independently a halogen atom, and $Y_4$ and $Y_5$ each independently connect with adjacent oxygens to form a ring having a C1 to C3 alkyl group, wherein hydrogen of the ring may be substituted with at least one of a halogen atom, oxygen, or a C1 to C3 alkyl group substituted with a halogen atom or unsubstituted.

In this case, the salt represented by Chemical Formula 3 may be represented by at least one selected from the group consisting of the following Chemical Formulas 3-1 to 3-13.

[Chemical Formula 3-1]

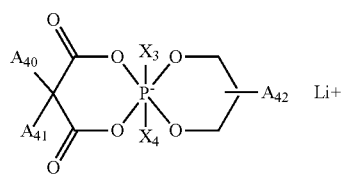

In Chemical Formula 3-1, $X_3$ and $X_4$ are each independently a halogen atom, and $A_{40}$ to $A_{42}$ are each independently selected from the group consisting of hydrogen, a halogen atom, and a C1 to C3 alkyl group substituted with a halogen atom or unsubstituted.

[Chemical Formula 3-2]

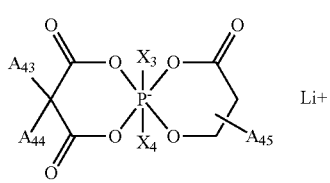

In Chemical Formula 3-2, $X_3$ and $X_4$ are each independently a halogen atom, and $A_{43}$ to $A_{45}$ are each independently selected from the group consisting of hydrogen, a halogen atom, and a C1 to C3 alkyl group substituted with a halogen atom or unsubstituted.

[Chemical Formula 3-3]

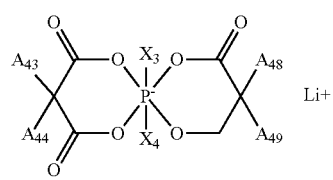

In Chemical Formula 3-3, $X_3$ and $X_4$ are each independently a halogen atom, and $A_{46}$ to $A_{49}$ are each independently selected from the group consisting of hydrogen, a halogen atom, and a C1 to C3 alkyl group substituted with a halogen atom or unsubstituted.

[Chemical Formula 3-4]

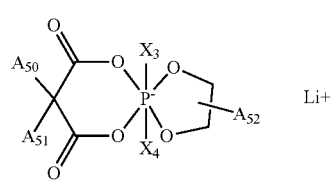

In Chemical Formula 3-4, $X_3$ and $X_4$ are each independently a halogen atom, and $A_{50}$ to $A_{52}$ are each independently selected from the group consisting of hydrogen, a halogen atom, and a C1 to C3 alkyl group substituted with a halogen atom or unsubstituted.

[Chemical Formula 3-5]

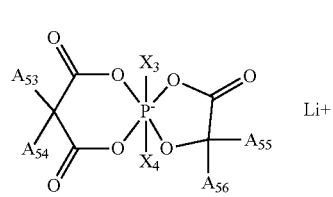

In Chemical Formula 3-5, $X_3$ and $X_4$ are each independently a halogen atom, and $A_{53}$ to $A_{56}$ are each independently selected from the group consisting of hydrogen, a halogen atom, and a C1 to C3 alkyl group substituted with a halogen atom or unsubstituted.

[Chemical Formula 3-6]

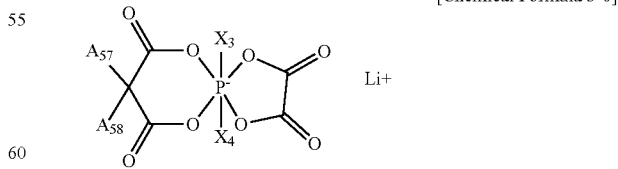

In Chemical Formula 3-6, $X_3$ and $X_4$ are each independently a halogen atom, and $A_{57}$ and $A_{58}$ are each independently selected from the group consisting of hydrogen, a halogen atom, and a C1 to C3 alkyl group substituted with a halogen atom or unsubstituted.

[Chemical Formula 3-7]

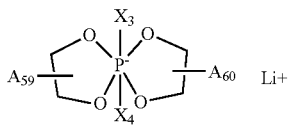

In Chemical Formula 3-7, $X_3$ and $X_4$ are each independently a halogen atom, and $A_{59}$ and $A_{60}$ are each independently selected from the group consisting of hydrogen, a halogen atom, and a C1 to C3 alkyl group substituted with a halogen atom or unsubstituted.

[Chemical Formula 3-8]

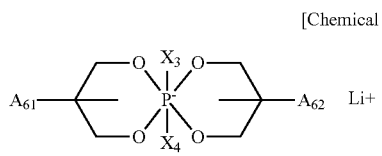

In Chemical Formula 3-8, $X_3$ and $X_4$ are each independently a halogen atom, and $A_{61}$ and $A_{62}$ are each independently selected from the group consisting of hydrogen, a halogen atom, and a C1 to C3 alkyl group substituted with a halogen atom or unsubstituted.

[Chemical Formula 3-9]

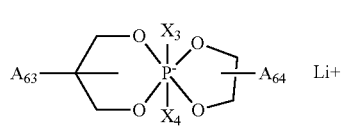

In Chemical Formula 3-9, $X_3$ and $X_4$ are each independently a halogen atom, and $A_{63}$ and $A_{64}$ are each independently selected from the group consisting of hydrogen, a halogen atom, and a C1 to C3 alkyl group substituted with a halogen atom or unsubstituted.

[Chemical Formula 3-10]

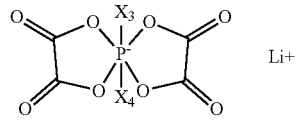

In Chemical Formula 3-10, $X_3$ and $X_4$ are each independently a halogen atom.

[Chemical Formula 3-11]

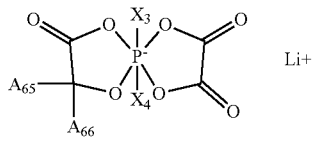

In Chemical Formula 3-11, $X_3$ and $X_4$ are each independently a halogen atom, and $A_{65}$ and $A_{66}$ are each independently selected from the group consisting of hydrogen, a halogen atom, and a C1 to C3 alkyl group substituted with a halogen atom or unsubstituted.

[Chemical Formula 3-12]

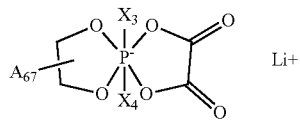

In Chemical Formula 3-12, $X_3$ and $X_4$ are each independently a halogen atom, and $A_{67}$ is selected from the group consisting of hydrogen, a halogen atom, and a C1 to C3 alkyl group substituted with a halogen atom or unsubstituted.

[Chemical Formula 3-13]

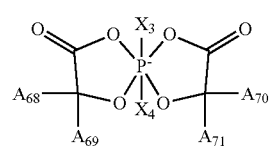

In Chemical Formula 3-13, $X_3$ and $X_4$ are each independently a halogen atom, and $A_{69}$ to $A_{71}$ are each independently selected from the group consisting of hydrogen, a halogen atom, and a C1 to C3 alkyl group substituted with a halogen atom or unsubstituted.

[Chemical Formula 4]

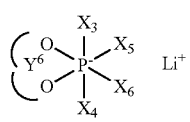

In Chemical Formula 4, $X_3$ to $X_6$ are each independently a halogen atom, and $Y_6$ connects with adjacent oxygens to form a ring having a C1 to C3 alkyl group, wherein hydrogen of the ring may be substituted with at least one of a halogen atom, oxygen, or a C1 to C3 alkyl group substituted with a halogen atom or unsubstituted.

In this case, the salt represented by Chemical Formula 4 may be represented by at least one selected from the group consisting of the following Chemical Formulas 4-1 to 4-6.

[Chemical Formula 4-1]

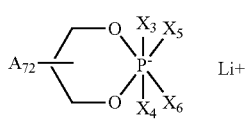

In Chemical Formula 4-1, $X_3$ to $X_6$ are each independently a halogen atom, and $A_{72}$ is selected from the group consisting of hydrogen, a halogen atom, and a C1 to C3 alkyl group substituted with a halogen atom or unsubstituted.

[Chemical Formula 4-2]

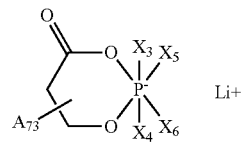

In Chemical Formula 4-2, $X_3$ to $X_6$ are each independently a halogen atom, and $A_{73}$ is selected from the group consisting of hydrogen, a halogen atom, and a C1 to C3 alkyl group substituted with a halogen atom or unsubstituted.

[Chemical Formula 4-3]

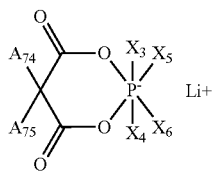

In Chemical Formula 4-3, $X_3$ to $X_6$ are each independently a halogen atom, and $A_{74}$ and $A_{75}$ are each independently selected from the group consisting of hydrogen, a halogen atom, and a C1 to C3 alkyl group substituted with a halogen atom or unsubstituted.

[Chemical Formula 4-4]

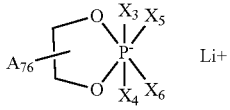

In Chemical Formula 4-4, $X_3$ to $X_6$ are each independently a halogen atom, and $A_{76}$ is selected from the group consisting of hydrogen, a halogen atom, and a C1 to C3 alkyl group substituted with a halogen atom or unsubstituted.

[Chemical Formula 4-5]

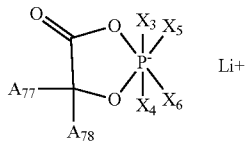

In Chemical Formula 4-5, $X_3$ to $X_6$ are each independently a halogen atom, and $A_{77}$ and $A_{78}$ are each independently selected from the group consisting of hydrogen, a halogen atom, and a C1 to C3 alkyl group substituted with a halogen atom or unsubstituted.

[Chemical Formula 4-6]

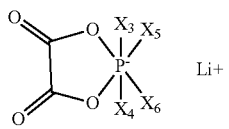

In Chemical Formula 4-6, $X_3$ to $X_6$ are each independently a halogen atom.

[Chemical Formula 5]

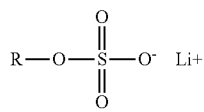

In Chemical Formula 5, R is a substituted or unsubstituted C1 to C5 alkyl group.

In this case, the salt represented by Chemical Formula 5 may be represented by at least one selected from the group consisting of the following Chemical Formulas 5-1 to 5-5.

[Chemical Formula 5-1]

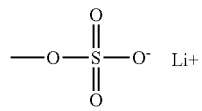

[Chemical Formula 5-2]

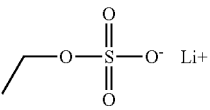

[Chemical Formula 5-3]

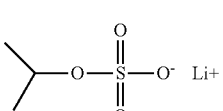

[Chemical Formula 5-4]

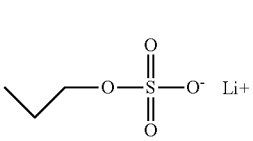

[Chemical Formula 5-5]

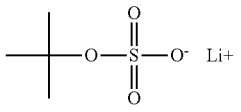

Since the additive used in the composition for forming a first solid electrolyte layer is reduced at a potential higher than a reduction potential of the glyme-based solvent included in the composition for forming a first solid electrolyte layer, the additive is reduced preferentially over the glyme-based solvent while a first solid electrolyte layer is formed by operating the half-cell. Therefore, the product formed by reducing the additive may be more stably included in the first solid electrolyte layer.

Meanwhile, the additive may be included in an amount of 0.1 part by weight to 30 parts by weight, preferably 1 part by weight to 15 parts by weight, and more preferably 2 parts by weight to 7 parts by weight, with respect to 100 parts by weight of the composition for forming a first solid electrolyte layer. When the additive is included within the above-described range, a first solid electrolyte layer with a constant thickness can be stably and uniformly formed on the working electrode, and the solubility of the additive can be maintained at a specific level or higher.

In this case, the additive is an ionic additive and thus may be considerably dissociated when the glyme-based solvent is used. In addition, when the additive thus dissociated is present in an ionic state, a reduction reaction uniformly proceeds, such that an SEI membrane may be more stably formed on the working electrode. For example, when compared with a carbonate-based solvent generally used in an electrolyte, the glyme-based solvent has a relatively high dipole moment such that the degree of movement of lithium ions and the degree of dissociation of salts may be enhanced, thereby a reduction reaction may stably proceed.

The glyme-based solvent includes glyme and polyglyme compounds. As a specific example, the glyme-based solvent may include at least one selected from the group consisting of ethylene glycol dimethyl ether ($CH_3OCH_2CH_2OCH_3$), diethylene glycol dimethyl ether ($CH_3(OCH_2CH_2)_2OCH_3$), diethylene glycol diethyl ether ($C_2H_5(OCH_2CH_2)_2OC_2H_5$), triethylene glycol dimethyl ether ($CH_3(OCH_2CH_2)_3OCH_3$), triethylene glycol diethyl ether ($C_2H_5(OCH_2CH_2)_3OC_2H_5$), and tetraethylene glycol dimethyl ether ($CH_3(OCH_2CH_2)_4OCH_3$).

(3) Step of Fabricating Half-Cell

Next, the step of fabricating a half-cell will be described. A half-cell according to the present invention includes a working electrode, a reference electrode, a counter electrode, and a composition for forming a first solid electrolyte layer. Since the descriptions of the working electrode and composition for forming a first solid electrolyte layer according to the present invention are the same as described above, detailed descriptions thereof will be omitted.

Meanwhile, the reference electrode is used as a feedback sensor for maintaining a constant voltage and a constant current by measuring and monitoring the potential of a counter electrode. As the reference electrode, a metal thin film, specifically, a metal thin film such as platinum, lithium, and the like, may be used.

The counter electrode is also called an auxiliary electrode and allows the current to flow so that a reaction takes place on the surface of the working electrode. When the current flows between the counter electrode and the working electrode, an oxidation reaction or a reduction reaction may take place on the surface of the working electrode according to the flow of the current. In general, as the counter electrode, a metal thin film such as platinum, lithium, and the like may be used. In recent years, research on the introduction of graphene has also been conducted.

A full-cell is in the form of a complete cell in which substantially both a positive electrode and a negative electrode to be used are involved in an electrochemical reaction, whereas a half-cell uses only one electrode of a cathode and an anode as a working electrode to induce the reaction. In the present invention, the half-cell is formed to induce a reaction for forming a first solid electrolyte layer on the working electrode according to a step to be described below.

More specifically, in the present invention, a working electrode, a reference electrode, and a counter electrode are sequentially disposed, and a composition for forming a first solid electrolyte layer serving as an ionic conductor which transfers ions is then interposed among the electrodes. The manner of interposing the composition for forming a first solid electrolyte layer may vary depending on the form of the composition, but the present invention is not limited to a specific method. Meanwhile, the composition for forming a first solid electrolyte layer is not only reacted to form a first solid electrolyte layer on the working electrode but also serves to transfer ions among the electrodes.

(4) Step of Forming First Solid Electrolyte Layer on Working Electrode

Next, the step of forming a first solid electrolyte layer on the working electrode will be described. A first solid electrolyte layer is formed on the working electrode by operating the half-cell fabricated in the previous step.

Specifically, during charging of the half-cell, a first solid electrolyte layer is formed while electrochemical oxidation ($A \rightarrow A^+ + e^-$) takes place on the working electrode and reduction ($B^+ + e^- \rightarrow B$) of the composition for forming a first solid electrolyte layer takes place at the interface with the working electrode. When the half-cell is operated, the voltage starting from the open circuit voltage (OCV) drops until it is close to 0 V.

Whether the first solid electrolyte layer is formed on the working electrode by operating the half-cell may be determined using a scanning electron microscope (SEM) image. Unlike a working electrode having not been subjected to any treatment processes (see FIG. 1), FIG. 2 and FIG. 3 show that the first solid electrolyte layer is formed on the working electrode.

Meanwhile, even when a full-cell assembled with a negative electrode having not been subjected to the treatment process according to the present invention is initially charged (formation process), the first solid electrolyte layer may be formed. However, since the components constituting the first solid electrolyte layer may vary depending on the composition of an electrolyte, and since the electrolyte applied to the full-cell needs to consider other types of performance of the battery in addition to the formation of the first solid electrolyte layer, a side reaction, in which the solvent of the electrolyte is first decomposed while the first solid electrolyte layer is formed in the initial charging process, may take place. Due to this side reaction, the SEI membrane is not stably and uniformly formed on the electrode in the initial charging.

The first solid electrolyte layer serves to transfer only ions while suppressing the interfacial reaction between the electrode and the electrolyte, and if the first solid electrolyte layer is not stably formed on the surface of the negative electrode, the first solid electrolyte layer may easily collapse under the condition of high temperature, overcharging, or the like. If the first solid electrolyte layer collapses, the interfacial reaction between the electrode and the electrolyte is not suppressed such that heat generation and thermal runaway which are caused by the side reaction may occur, and as a result, not only lifespan characteristics but also high-temperature safety of the battery may be degraded.

Therefore, the present invention overcomes the above-mentioned problems by operating the half-cell to form the first solid electrolyte layer on the working electrode and using a negative electrode on which the first solid electrolyte layer has been formed as a negative electrode for a lithium secondary battery.

(5) Step of Separating Working Electrode

Finally, the step of separating the working electrode will be described. In order to use the working electrode on which the first solid electrolyte layer has been formed through the above steps as a negative electrode for a lithium secondary battery, only the working electrode on which the first solid electrolyte layer has been formed is separated by removing all the other components constituting the half-cell.

In the separation process, an additional process such as drying the working electrode, washing to remove impurities, or the like may be further carried out, but the present invention is not limited to a specific process, and any treatment process may be carried out without limitation.

<Negative Electrode for Lithium Secondary Battery>

A negative electrode for a lithium secondary battery according to the present invention includes a metal thin film and a first solid electrolyte layer formed on the metal thin film.

The metal thin film may include at least one metal selected from the group consisting of copper, nickel, and lithium or a combination thereof.

Meanwhile, the metal thin film may have a multi-layer structure and include at least one lithium-containing metal layer.

As a specific example, when the metal thin film consists of at least one metal selected from the group consisting of copper and nickel or a combination thereof, the metal thin film may further include a lithium-containing metal layer on the surface thereof. In this case, as a manner of further including the lithium-containing metal layer, a conventional method of forming a metal layer, such as rolling, sputtering, electro plating a lithium metal on a metal thin film, or the like, may be used without limitation.

When the metal thin film includes a lithium metal layer and a negative electrode including the same is used, the self-supply of lithium ions is possible such that these lithium ions are deposited as a lithium metal as the battery is charged/discharged, and even when the amount of lithium ions is decreased, the content of lithium ions in the battery may be maintained at a specific level such that the lifespan characteristics of the battery can be enhanced.

The first solid electrolyte layer formed on the metal thin film is formed by operating the half-cell. More specifically, when the half-cell is operated, the composition for forming a first solid electrolyte layer including an additive including at least one salt selected from the salts represented by Chemical Formula 1 to Chemical Formula 5 and a glyme-based solvent is reduced to form a first solid electrolyte layer. Since the description of the first solid electrolyte layer is the same as described above, detailed descriptions thereof will be omitted.

A second solid electrolyte layer is formed on the first solid electrolyte layer. Referring to the above-described manufacturing method, although the second solid electrolyte layer is first formed on the metal thin film, the first solid electrolyte layer is formed between the metal thin film and the second solid electrolyte layer, such that the metal thin film, the first solid electrolyte layer, the second solid electrolyte layer are formed in the written order. Since the description of the second solid electrolyte layer is also the same as described above, detailed descriptions thereof will be omitted.

<Lithium Secondary Battery>

A lithium secondary battery according to the present invention includes a positive electrode, a negative electrode, and an electrolyte for a lithium secondary battery. Optionally, a separator may be further included according to the form of the electrolyte for a lithium secondary battery. Since the description of the negative electrode according to the present invention is the same as described above, detailed descriptions thereof will be omitted.

The positive electrode may be manufactured by applying, on a metal positive electrode current collector, a positive electrode mixture slurry including a positive electrode active material, a binder, a conductive material, a solvent, and the like.

The metal positive electrode current collector generally has a thickness of 3 μm to 500 μm. The metal positive electrode current collector is not particularly limited as long as it does not cause a chemical change in the battery and has conductivity. For example, stainless steel, aluminum, nickel, titanium, calcined carbon, or aluminum or stainless steel whose surface has been treated with carbon, nickel, titanium, silver, or the like may be used.

The positive electrode active material may include a compound enabling the reversible intercalation and deintercalation of lithium, specifically, a lithium composite metal oxide including lithium and one or more types of metals such as cobalt, manganese, nickel, and aluminum.

The binder is a component that assists the adhesion between the positive electrode active material and the conductive material and the adhesion between the positive electrode active material and the current collector. Specifically, the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene (PE), polypropylene, an ethylene-propylene-diene terpolymer (EPDM), a sulfonated-EPDM, styrene butadiene rubber, fluorine rubber, various copolymers thereof, or the like.

The conductive material is a component for further enhancing the conductivity of the positive electrode active material. The conductive material is not particularly limited as long as it does not cause a chemical change in the battery and has conductivity. For example, graphite; a carbon-based material such as carbon black, acetylene black, Ketjen black, channel black, furnace black, lamp black, thermal black, or the like; a conductive fiber such as a carbon fiber, a metal fiber, or the like; a metal powder such as carbon fluoride powder, aluminum powder, nickel powder, or the like; a conductive whisker consisting of zinc oxide, potassium titanate, or the like; a conductive metal oxide such as titanium oxide or the like; and a conductive polymer such as a polyphenylene derivative or the like may be used.

The solvent may include an organic solvent such as N-methyl-2-pyrrolidone (NMP) or the like and may be used in an amount such that a desirable viscosity is exhibited when the positive electrode active material, and, optionally, the binder, the conductive material, and the like are included.

The electrolyte for a lithium secondary battery is a medium used for ion conduction between both electrodes and may be selected from a liquid electrolyte, a gel polymer electrolyte, and a solid electrolyte. The form of the electrolyte may vary depending on the device to which the lithium secondary battery is applied and is not limited to a specific type.

When the electrolyte for a lithium secondary battery is a liquid electrolyte, an organic solvent and a lithium salt are included, when the electrolyte is an ionic liquid electrolyte, a molten salt and a lithium salt are used together, when the electrolyte is a solid polymer electrolyte, a polymer and a lithium salt are used together, and when the electrolyte is a gel polymer electrolyte, a polymer, an organic solvent, and a lithium salt are used together. In this case, in the case of the gel polymer electrolyte, an oligomer may be first injected and then cured through an additional process to form a polymer.

The lithium salt serves to impart ionic conductivity, and specific examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carbonic acid lithium, and the like.

The organic solvent may be, for example, an aprotic organic solvent such as N-methyl-2-pyrrolidone, propylene carbonate, ethylene carbonate, butylene carbonate, dimethyl carbonate, diethyl carbonate, gamma-butyrolactone, 1,2-dimethoxyethane, tetrahydroxy franc, 2-methyl tetrahydrofuran, dimethyl sulfoxide, 1,3-dioxolane, formamide, dimethylformamide, dioxolon, acetonitrile, nitromethane, methyl formate, methyl acetate, phosphate triester, trimethoxy methane, dioxolane derivatives, sulfolane, methyl sulfolane, 1,3-dimethyl-2-imidazolidinone, propylene carbonate derivatives, tetrahydrofuran derivatives, ethers, methyl pyropionate, ethyl propionate, or the like.

Meanwhile, the organic solvent may further include an ionic liquid as necessary. The ionic liquid is a component having high ion conductivity and enhances the movement of lithium ions, $Li^+$ flux, in the gel polymer electrolyte, such that a $Li^+$ plating or stripping phenomenon on the negative electrode surface may be uniformly adjusted to suppress the formation of lithium dendrites. In addition, when applied to the inside of the battery, the ionic liquid may realize stability due to having flame retardancy.

For example, the ionic liquid may include one or more selected from the group consisting of diethylmethylammonium trifluoromethanesulfonate, dimethylpropylammonium trifluoromethanesulfonate, N,N-diethyl-N-methyl-N-(2-methoxyethyl)ammonium bis(trifluoromethanesulfonyl)imide, N-methyl-N-propylpiperidinium bis(trifluoromethanesulfonyl)imide, N-butyl-N-methylpyrrolidinium bis(trifluoromethanesulfonyl)imide, and methyl propylpiperidinium trifluoromethanesulfonylimide.

The separator may be used when the electrolyte for a lithium secondary battery is a liquid electrolyte or a gel polymer electrolyte. When the electrolyte for a lithium secondary battery is a solid polymer electrolyte, the solid polymer electrolyte may also serve as a separator and thus may be used without adding a separator.

The separator is interposed between the positive electrode and the negative electrode, and an insulating thin film having high ion permeability and mechanical strength is used as the separator. The separator generally has a pore diameter of 0.01 μm to 10 μm and a thickness of 5 μm to 300 μm. As such a separator, for example, a nonwoven fabric or a sheet made of an olefin-based polymer such as polypropylene with chemical resistance and hydrophobicity; glass fiber; polyethylene; or the like may be used.

Hereinafter, the present invention will be described in more detail by way of specific examples. However, these examples are provided only to promote understanding of the present invention, and the scope of the present invention is not limited to these examples in any sense. It should be clear to those skilled in the art that various changes and modifications can be made to the exemplary embodiments of the present invention without departing from the spirit and scope of the present invention, so that the present invention covers all such changes and modifications provided they are within the scope of the appended claims and their equivalents.

EXAMPLES

1. Example 1

A lithium metal thin film as a counter electrode, a lithium metal thin film as a reference electrode, and a copper metal thin film as a working electrode were prepared. A composition for forming a first solid electrolyte layer was prepared by adding 0.7 g of lithium bis(oxalato)borate (LiBOB) as an additive to 9.3 g of DME as a solvent. The counter electrode, reference electrode, and working electrode were sequentially disposed, the composition for forming a first solid electrolyte layer was then injected to fabricate a half-cell, and the half-cell was operated until a voltage starting from the open circuit voltage (OCV) reached 0.2 V. Afterward, the working electrode on which a first solid electrolyte layer had been formed was separated from the half-cell and dried, thereby manufacturing a negative electrode for a lithium secondary battery.

2. Example 2

A negative electrode for a lithium secondary battery was manufactured in the same manner as in Example 1 except that a copper metal thin film on which a lithium metal had been deposited was used as a working electrode.

3. Example 3

A negative electrode for a lithium secondary battery was manufactured in the same manner as in Example 1 except that a composition for forming a first solid electrolyte layer prepared by adding 0.7 g of lithium difluoro(oxalato)phosphate (LiDFOP) as an additive to 9.3 g of DME as a solvent was used.

4. Example 4

A negative electrode for a lithium secondary battery was manufactured in the same manner as in Example 1 except that a composition for forming a first solid electrolyte layer prepared by adding 0.7 g of the compound represented by Chemical Formula 5-2 as an additive to 9.3 g of DME as a solvent was used.

5. Example 5

A negative electrode for a lithium secondary battery was manufactured in the same manner as in Example 1 except that a composition for forming a first solid electrolyte layer prepared by adding 0.5 g of LiBOB as an additive to 9.5 g tetraethylene glycol dimethyl ether (TEGDME) as a solvent was used.

6. Example 6

A negative electrode for a lithium secondary battery was manufactured in the same manner as in Example 1 except that a composition for forming a first solid electrolyte layer prepared by adding 0.5 g of LiDFOP as an additive to 9.5 g of TEGDME as a solvent was used.

7. Example 7

A copper metal thin film (thickness: 20 μm) was provided, and a composition for forming a second solid electrolyte layer was prepared by adding 1 g of a polymer (weight-average molecular weight (Mw)=100,000 g/mol, a=600, b=150) including a repeat unit represented by the following Chemical Formula A and 2 g of inorganic oxide particles LLZO to 97 g of N-methyl-2-pyrrolidone (NMP) as a solvent and stirring the mixture. Afterward, the composition for forming a second solid electrolyte layer was applied on one surface of the copper metal thin film and dried to completely remove a solvent, thereby preparing a working electrode in which a 1-m-thick second solid electrolyte layer had been formed on the copper metal thin film.

A lithium metal thin film as a counter electrode and a lithium metal thin film as a reference electrode were provided. Afterward, a composition for forming a first solid electrolyte layer was prepared by adding 0.7 g of LiBOB as an additive to 9.3 g of DME as a solvent. The counter electrode, reference electrode, and working electrode were sequentially disposed, the composition for forming a first solid electrolyte layer was then injected to fabricate a half-cell, and the half-cell was operated until a voltage starting from the OCV reached 0.2 V. Afterward, the working electrode in which the first solid electrolyte layer had been formed on the second solid electrolyte layer was separated from the half-cell and dried, thereby manufacturing a negative electrode for a lithium secondary battery.

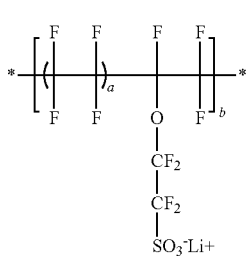

[Chemical Formula A]

8. Example 8

A negative electrode for a lithium secondary battery was manufactured in the same manner as in Example 7 except that a copper metal thin film on which a lithium metal had been deposited was used as a working electrode.

9. Example 9

A negative electrode for a lithium secondary battery was manufactured in the same manner as in Example 7 except that a composition for forming a first solid electrolyte layer prepared by adding 0.7 g of LiDFOP as an additive to 9.3 g of DME as a solvent was used.

10. Example 10

A negative electrode for a lithium secondary battery was manufactured in the same manner as in Example 7 except that a composition for forming a first solid electrolyte layer prepared by adding 0.7 g of the compound represented by Chemical Formula 5-2 as an additive to 9.3 g of DME as a solvent was used.

11. Example 11

A negative electrode for a lithium secondary battery was manufactured in the same manner as in Example 7 except that a composition for forming a first solid electrolyte layer prepared by adding 0.5 g of LiBOB as an additive to 9.5 g TEGDME as a solvent was used.

12. Example 12

A negative electrode for a lithium secondary battery was manufactured in the same manner as in Example 7 except that a composition for forming a first solid electrolyte layer prepared by adding 0.5 g of LiDFOP as an additive to 9.5 g of TEGDME as a solvent was used.

13. Example 13

A negative electrode for a lithium secondary battery was manufactured in the same manner as in Example 7 except that a second solid electrolyte layer was formed to have a thickness of 2 m.

COMPARATIVE EXAMPLES

1. Comparative Example 1

A copper metal thin film (thickness: 20 μm) was provided as a negative electrode for a lithium secondary battery.

2. Comparative Example 2

A copper metal thin film (thickness: 20 μm) on which a lithium metal had been deposited was provided as a negative electrode for a lithium secondary battery.

3. Comparative Example 3

A silicon (Si) electrode was provided as a negative electrode for a lithium secondary battery.

4. Comparative Example 4

A graphite electrode was provided as a negative electrode for a lithium secondary battery.

5. Comparative Example 5

A negative electrode for a lithium secondary battery was manufactured in the same manner as in Example 1 except that vinylene carbonate (VC) instead of LiBOB was used as an additive of a composition for forming a first solid electrolyte layer.

6. Comparative Example 6

A negative electrode for a lithium secondary battery was manufactured in the same manner as in Example 1 except that tetrahydrofuran (THF) instead of DME was used as a solvent of a composition for forming a first solid electrolyte layer.

7. Comparative Example 7

A negative electrode for a lithium secondary battery was manufactured in the same manner as in Example 7 except that VC instead of LiBOB was used as an additive of a composition for forming a first solid electrolyte layer.

8. Comparative Example 8

A negative electrode for a lithium secondary battery was manufactured in the same manner as in Example 7 except that THE instead of DME was used as a solvent of a composition for forming a first solid electrolyte layer.

[Fabrication of Lithium Secondary Battery]

94 wt % of a 4.2 V-class $LiCoO_2$ compound as a positive electrode active material, 4 wt % of carbon black as a conductive material, and 2 wt % of PVDF as a binder were added to N-methyl-2-pyrrolidone (NMP) as a solvent to prepare a positive electrode active material slurry. The positive electrode active material slurry was applied with a thickness of 10 μm on the surface of a 20-μm-thick aluminum (Al) thin film and then dried, thereby manufacturing a positive electrode for a lithium secondary battery including a positive electrode active material layer formed therein.

As an electrolyte for a lithium secondary battery, an electrolyte was prepared by adding $LiPF_6$ at a concentration of 1 M to an electrolyte solution including fluoroethylene carbonate (FEC), ethylene carbonate (EC), and ethyl methyl carbonate (EMC) mixed in a volume ratio of 5:25:70, and then adding VC as an additive at 1 wt % with respect to the total weight of the electrolyte solution.

As a separator, a polyethylene (PE) sheet was provided.

The manufactured positive electrode, the separator, and each of the negative electrodes manufactured according to Examples and Comparative Examples were sequentially stacked to prepare an electrode assembly, the electrode assembly was then placed in a pouch-type battery case, and the electrolyte for a lithium secondary battery was injected, thereby fabricating a 4.2 V-class lithium secondary battery (full-cell) according to each of Examples and Comparative Examples.

EXPERIMENTAL EXAMPLES

1. Experimental Example 1: Evaluation of Capacity of Lithium Secondary Battery Each of the lithium secondary batteries fabricated according to Examples and Comparative Examples was subjected to a formation process and then one charge/discharge cycle at a charging/discharging rate of 0.2 C/0.5 C at each of room temperature (25° C.) and high temperature (45° C.) to measure initial discharge capacity. Afterward, a ratio of discharge capacity of each lithium secondary battery to reference discharge capacity was measured, and results thereof are shown in the following Table 1. In this case, the capacity of the lithium secondary battery of Example 1 was used as a reference discharge capacity for Examples 1 to 6 and Comparative Examples 1 to 6, and the capacity of the lithium secondary battery of Example 7 was used as a reference discharge capacity for Examples 7 to 13 and Comparative Examples 7 and 8.

TABLE 1

| | Capacity ratio (%) | |
| --- | --- | --- |
| | Room temperature (25° C.) | High temperature (65° C.) |
| Example 1 | 100 | 100 |
| Example 2 | 121 | 148 |
| Example 3 | 116 | 160 |
| Example 4 | 97 | 98 |
| Example 5 | 92 | 92 |
| Example 6 | 109 | 151 |
| Example 7 | 100 | 100 |
| Example 8 | 126 | 163 |
| Example 9 | 120 | 172 |
| Example 10 | 96 | 98 |
| Example 11 | 94 | 95 |
| Example 12 | 111 | 168 |
| Example 13 | 95 | 97 |
| Comparative Example 1 | 5 | 6 |
| Comparative Example 2 | 8 | 8 |
| Comparative Example 3 | 70 | 66 |
| Comparative Example 4 | 76 | 72 |
| Comparative Example 5 | 36 | 33 |
| Comparative Example 6 | 24 | 30 |
| Comparative Example 7 | 29 | 26 |
| Comparative Example 8 | 19 | 24 |

Referring to Table 1, it can be seen that the capacities of Comparative Examples were significantly lower than those of Examples.

2. Experimental Example 2: Test for Measurement of Interfacial Resistance

The interfacial resistances of the lithium secondary batteries fabricated according to Examples and Comparative Examples were measured using a Biologic VMP3 instrument (1 MHz to 100 uHz range, 25° C. condition), and a ratio of interfacial resistance of each lithium secondary battery to reference interfacial resistance was measured, and results thereof are shown in the following Table 2. In this case, the interfacial resistance of the lithium secondary battery of Example 1 was used as a reference interfacial resistance for Examples 1 to 6 and Comparative Examples 1 to 6, and the interfacial resistance of the lithium secondary battery of Example 7 was used as a reference interfacial resistance for Examples 7 to 13 and Comparative Examples 7 and 8.

TABLE 2

| | Interfacial resistance ratio (%) |
| --- | --- |
| Example 1 | 100 |
| Example 2 | 100 |
| Example 3 | 81 |
| Example 4 | 105 |
| Example 5 | 107 |
| Example 6 | 86 |
| Example 7 | 100 |
| Example 8 | 100 |
| Example 9 | 96 |
| Example 10 | 126 |
| Example 11 | 128 |
| Example 12 | 101 |
| Example 13 | 106 |
| Comparative Example 1 | 1870 |
| Comparative Example 2 | 1910 |
| Comparative Example 3 | 156 |
| Comparative Example 4 | 134 |
| Comparative Example 5 | 370 |
| Comparative Example 6 | 215 |
| Comparative Example 7 | 510 |
| Comparative Example 8 | 262 |

Referring to Table 2, it can be seen that the interfacial resistances of Comparative Examples were significantly higher than those of Examples.

3. Experimental Example 3: Scanning Electron Microscope (SEM) Observation

Figure 2:
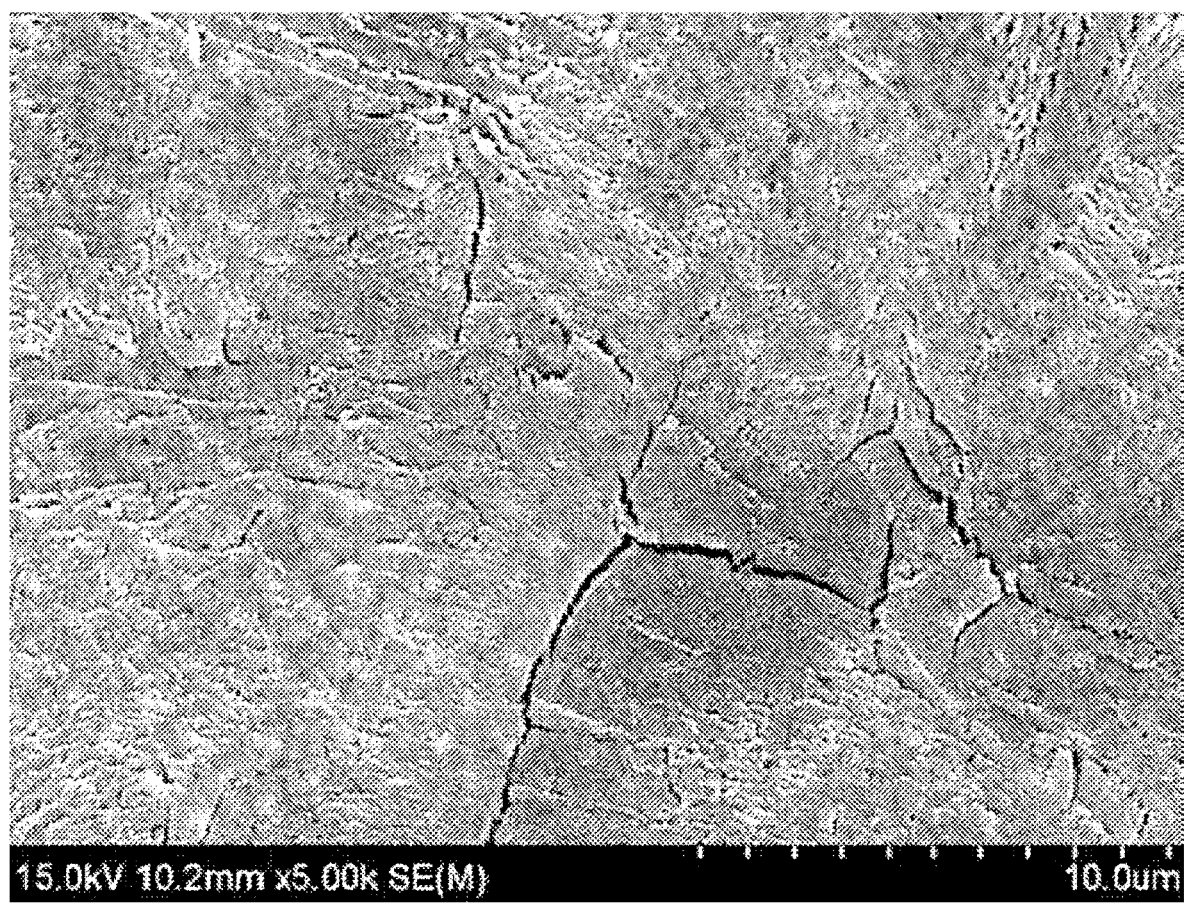
FIG. 2 is an SEM image of a negative electrode for a lithium secondary battery according to Example 1.
Figure 3:
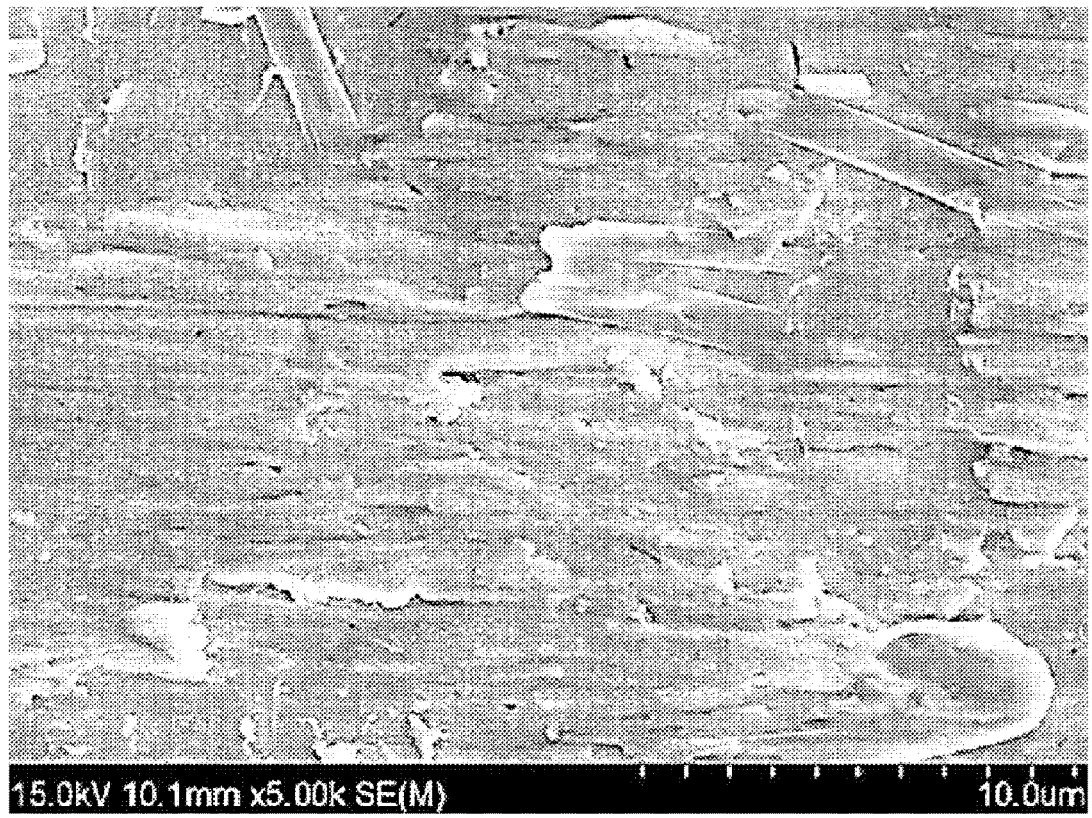
FIG. 3 is an SEM image of a negative electrode for a lithium secondary battery according to Example 3.
Figure 4:
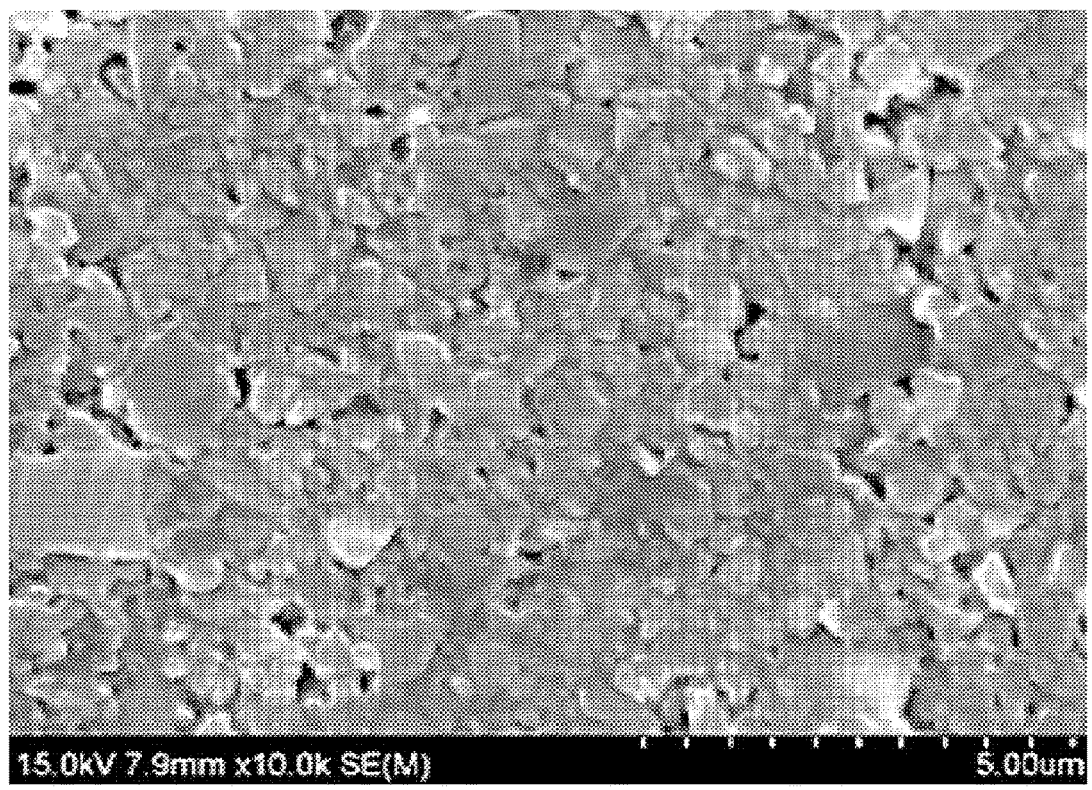
FIG. 4 is an SEM image of a negative electrode for a lithium secondary battery according to Example 4.

The negative electrodes for a lithium secondary battery, which were manufactured according to Comparative Example 1, Example 1, Example 3, and Example 4, were observed under a scanning electron microscope (SEM), and results thereof are shown in FIG. 1 (Comparative Example 1), FIG. 2 (Example 1), FIG. 3 (Example 3), and FIG. 4 (Example 4).

In the case of FIG. 2 to FIG. 4, it can be seen that the first solid electrolyte layer was formed on the working electrode, unlike the working electrode (see FIG. 1) which was not subjected to any treatment. Meanwhile, FIG. 4 showed that there was no significant difference from FIG. 2, in which only the second solid electrolyte layer was formed, in terms of the surface even after the first solid electrolyte layer was formed, and it can be seen through this result that the first solid electrolyte layer was uniformly formed at an interface between the working electrode and the second solid electrolyte layer.

The invention claimed is:

1. A method of manufacturing a negative electrode for a lithium secondary battery, the method comprising:
   preparing a working electrode including a metal thin film;
   preparing a composition for forming a first solid electrolyte layer including an additive including at least one salt represented by any one of Chemical Formulas 3-1 to 3-13 and a glyme-based solvent;
   fabricating a half-cell including the working electrode, a counter electrode, a reference electrode, and the composition for forming the first solid electrolyte layer;
   forming the first solid electrolyte layer on the working electrode by operating the half-cell; and
   separating the working electrode on which the first solid electrolyte layer has been formed,
   wherein the preparing of the working electrode further includes forming, on the metal thin film, a second solid electrolyte layer including inorganic oxide particles and a polymer,
   the first solid electrolyte layer is formed between the metal thin film and the second solid electrolyte layer, and
   the metal thin film includes at least one of copper, nickel, or lithium,

[Chemical Formula 3-1]

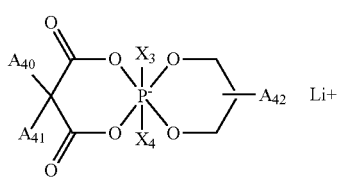

[Chemical Formula 3-2]

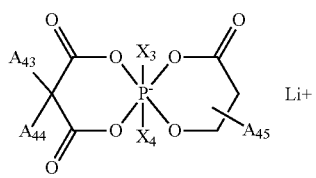

[Chemical Formula 3-3]

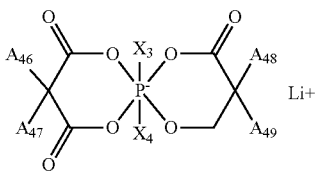

[Chemical Formula 3-4]

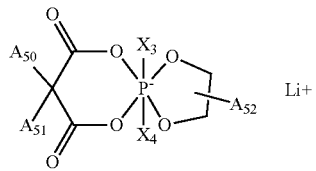

[Chemical Formula 3-5]

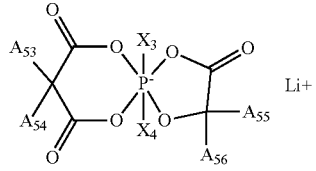

[Chemical Formula 3-6]

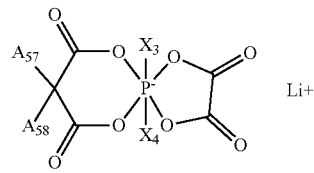

[Chemical Formula 3-7]

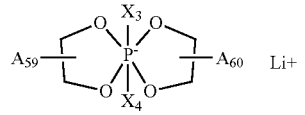

[Chemical Formula 3-8]

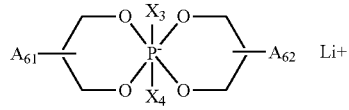

[Chemical Formula 3-9]

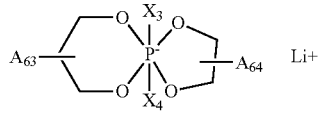

[Chemical Formula 3-10]

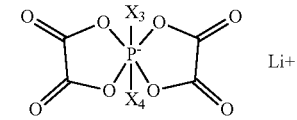

[Chemical Formula 3-11]

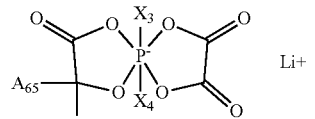

[Chemical Formula 3-12]

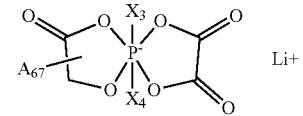

[Chemical Formula 3-13]

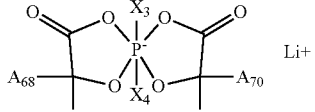

wherein, in Chemical Formula 3-1 to Chemical Formula 3-13, $X_3$ and $X_4$ are each independently a halogen atom, and $A_{40}$ to $A_{71}$ are each independently selected from the group consisting of hydrogen, a halogen atom, and a C1 to C3 alkyl group unsubstituted or substituted with a halogen atom.

2. The method of claim 1, wherein the additive is included in an amount of 0.1 part by weight to 30 parts by weight with respect to 100 parts by weight of the composition for forming the first solid electrolyte layer.

3. The method of claim 1, wherein the inorganic oxide particles include at least one of Li, La, Zr, Ti, Al, Ge, P, W, Nb, Te, Ln, Si, Nd, N, S, Ba, Ga, In, F, Cl, Br, I, As, Se, Te, Sb, Sn, or Ru.

4. The method of claim 1, wherein the metal thin film has a multi-layer structure and includes at least one lithium-containing metal layer.

5. The method of claim 1, wherein the metal thin film includes at least one of copper or nickel, and the metal thin film further includes a lithium-containing metal layer on the surface thereof.

6. The method of claim 1, wherein the glyme-based solvent comprises at least one of ethylene glycol dimethyl ether ($CH_3OCH_2CH_2OCH_3$), diethylene glycol dimethyl ether ($CH_3(OCH_2CH_2)_2OCH_3$), diethylene glycol diethyl ether ($C_2H_5(OCH_2CH_2)_2OC_2H_5$), triethylene glycol dimethyl ether ($CH_3(OCH_2CH_2)_3OCH_3$), triethylene glycol diethyl ether ($C_2H_5(OCH_2CH_2)_3OC_2H_5$), or tetraethylene glycol dimethyl ether ($CH_3(OCH_2CH_2)_4OCH_3$).

* * * * *